United States Patent [19]

Sheffield et al.

[11] Patent Number: 4,653,997
[45] Date of Patent: Mar. 31, 1987

[54] INJECTION MOLD APPARATUS WITH GAS EJECTION

[75] Inventors: James S. Sheffield, Alliston; Jacob Van Halteren, Richmond Hill, both of Canada

[73] Assignee: Izon Industries Inc. Unit #11, Rexdale, Canada

[21] Appl. No.: 768,681

[22] Filed: Aug. 23, 1985

[51] Int. Cl.⁴ .............................................. B29C 45/43
[52] U.S. Cl. ................................ 425/556; 249/66 A; 264/335; 425/351; 425/437
[58] Field of Search .................. 249/66 A, 66 C, 68; 425/554, 556, 274, 286, 350, 351, 422, 437, DIG. 102; 264/335

[56] References Cited

U.S. PATENT DOCUMENTS

| 2,396,406 | 3/1946  | Anderson    | 425/96    |
| 2,739,349 | 3/1956  | Strauss     | 425/152   |
| 2,773,284 | 12/1956 | Kelly       | 425/566   |
| 2,929,105 | 3/1960  | Starck et al. | 425/437 |
| 3,183,292 | 5/1965  | Dvoracek    | 264/335   |
| 3,660,002 | 5/1972  | Morroni     | 425/422   |
| 4,009,978 | 3/1977  | Hanning     | 249/66 A  |
| 4,155,698 | 5/1979  | Aichinger   | 425/556   |
| 4,375,948 | 3/1983  | von Holdt   | 425/556   |
| 4,431,397 | 2/1984  | Fried et al. | 249/66 A |
| 4,438,065 | 3/1984  | Brown       | 264/335   |

FOREIGN PATENT DOCUMENTS 50-6854  3/1975  Japan .................................... 425/437

Primary Examiner—Jay H. Woo
Assistant Examiner—Timothy W. Heitbrink

[57] ABSTRACT

The present invention provides an injection mold apparatus for plastic piece molding. The apparatus includes male and female body parts and a gas blow-off ejection system for ejecting pieces formed on the male body part. The blow-off system includes side and top opening vents in the male body part for initial release and slight lifting of the piece and a further bottom positioned final blow-off vent, which is covered by slideable means during introduction of the plastic to the mold to prevent the plastic from flowing into the final blow-off vent and which is only exposed when required for completing blowing of the piece from the male body part. The slideable means has a slide tolerance to substantially eliminate flowing of the mold material therearound while being readily slideable when required for exposure of the blow-off vent to the male body part.

5 Claims, 5 Drawing Figures

INJECTION MOLD APPARATUS WITH GAS EJECTION

FIELD OF THE INVENTION

The present invention relates to an injection mold apparatus operating with a gas blow-off for ejecting pieces from the mold and including a protection for preventing flashing or overflow of the mold material into the gas blow-off system.

BACKGROUND OF THE INVENTION

According to plastic injection molding techniques, a piece to be molded is formed around a male body part within the mold apparatus from which the piece must be ejected to allow the molding of further pieces. At the present time mechanical stripper ring ejectors are most widely accepted in the molding field. However, it has recently been discovered that gas blow-off systems provide advantages such as reducing core shift problems resulting from mechanical pressure which causes thickness differential problems in thin walled containers using these stripper ring mechanical ejectors. However, with gas blow-off if there is overflow of the mold material, known in the industry as flashing, then this overflow can block the vents used in the blow-off requiring the mold apparatus to be shut down and cleaned out, which may take many hours of down time.

SUMMARY OF THE PRESENT INVENTION:

The present invention provides an injection mold apparatus for plastic piece molding and having a gas blow-off system designed to overcome the flashing problems described above. More particularly, the injection molding apparatus of the present invention comprises means for injecting flowing plastic material into the mold cavity, a male body part around which the plastic material forms the piece, a female body part for mating with the male body part to shape the piece and gas ejecting means for ejecting the piece from the male body part after it has been formed.

The gas ejection system comprises a side opening vent in the male body part for side release of the piece, a top opening vent in the male body part for top release and initial lifting of the piece from the male body part and a blow-off vent at the base of the male body part with slideable means being provided for covering the base blow off vent from the plastic material while it is flowing into the mold cavity to thereby essentially eliminate the flashing of the plastic material into the base blow-off vent. After the piece has been formed, the slideable means exposes the base blow-off vent to provide final ejection of the piece from the male body part.

The slideable means has a slide tolerance of, for example, 2 to 6 ten thousandths of an inch, which substantially eliminates flowing of the plastic material around the slideable means to the blow-off of the plastic material around the slideable means to the flow-off vent while allowing sliding of the slideable means for exposure of the blow-off vent when required.

BRIEF DESCRIPTION OF THE DRAWINGS

The above, as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
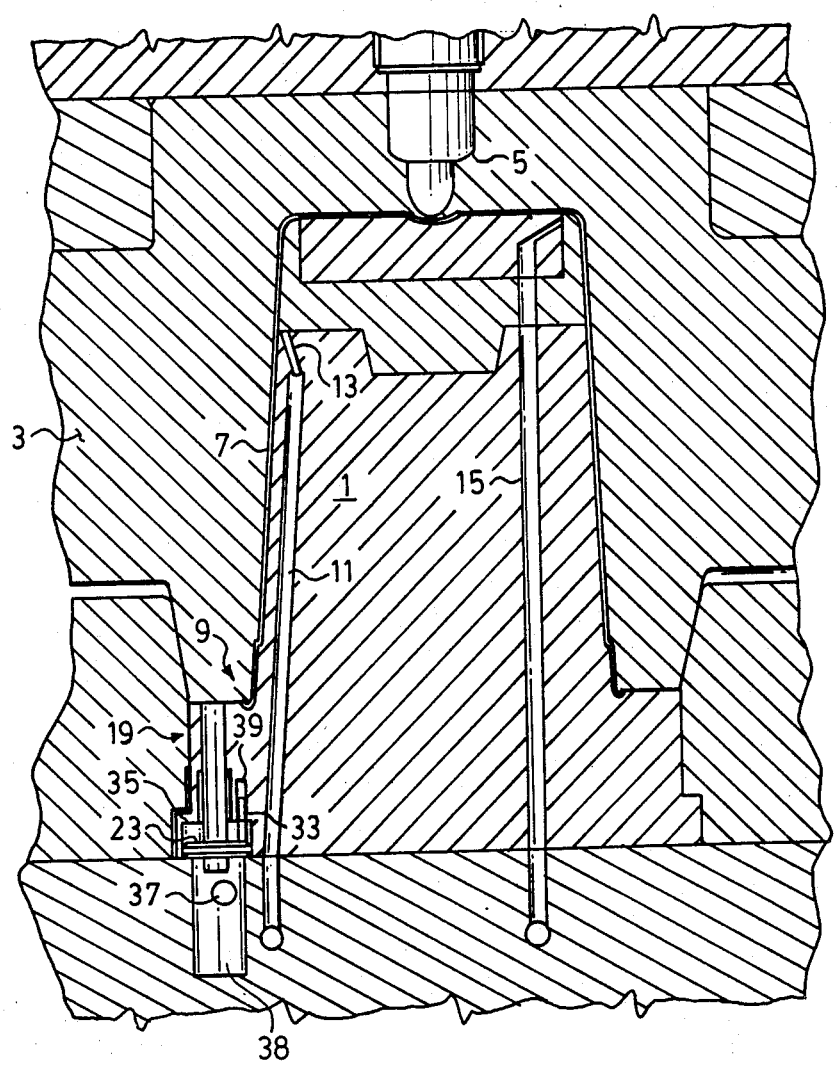
FIG. 1 is a sectional view through a closed mold, according to a preferred embodiment of the present invention.

As seen in FIG. 1, the molding apparatus consists of a male body part 1, a female body part 3, for mating with the male body part when the cavity is closed and an injector 5 for injecting plastic material between the male and female body parts of the closed mold cavity. The system operates such that the injector delivers flowing plastic material only after the mold cavity has been closed, as in the FIG. 1 position. Once the injection has been completed the part or piece 7 is tightly shaped around the male body part.

The mold arrangement further provides an air blow-off system for ejecting the formed piece from the male body part to allow for further molding operations. This air blow-off system includes internal air channels 11 and 15, venting at 13 and 17, respectively to the side and top surfaces of the male part of the mold. Generally these vents do not clog because of the thinness of the line-like openings from the vents around and at the top of the male body part.

Figure 2:
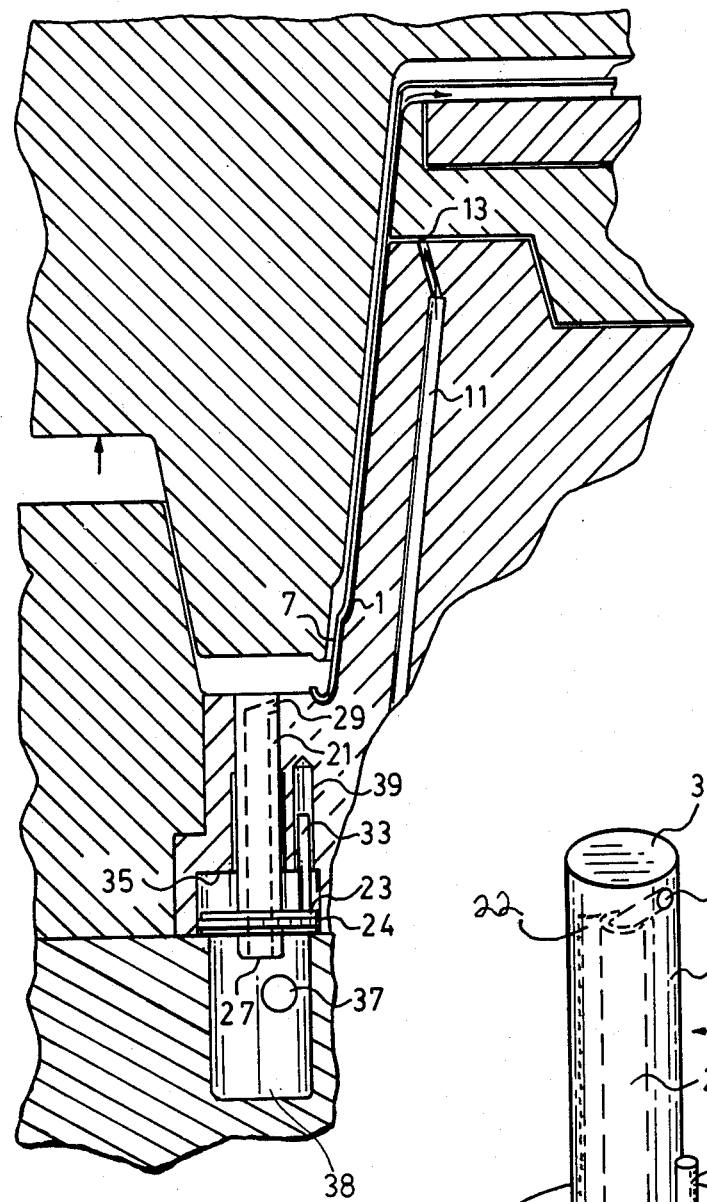
FIGS. 2 through 4 are further sectional views of the molding apparatus of FIG. 1, showing sequential blow-off stages with opening of the mold.

FIG. 2 shows the initial separation of the two mold sections at which time air is fed from a supply source up channel 11 and out through vent 13. This side venting of the air provides a slight side release of the piece from the male body part.

Figure 3:
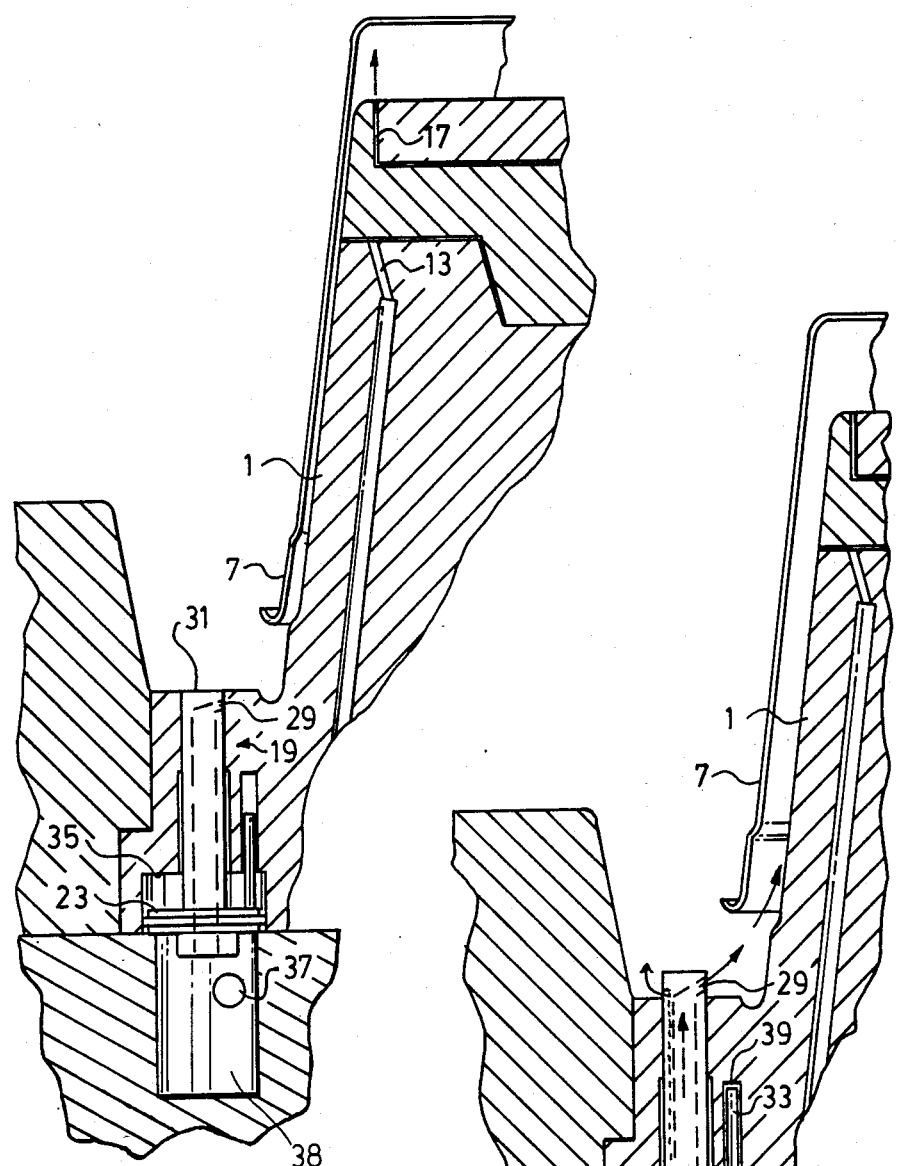

The next stage in the ejection or blow-off operation is shown in FIG. 3 where the air supply source then provides air up through channel 15 and out through the top vent 17. This provides a top release and slight lifting of the formed piece from the male body part.

To this point the air blow-off has only really affected separation of the plastic piece from the side and top surfaces of the male body part. The final ejection of the piece is provided by means of a reciprocating pin, or nozzle, generally indicated at 19 in FIG. 5 and positioned adjacent the base region 9 of the male body part.

Blow-off pin 19 comprises an extended pin body 21, having an enlarged bottom end 23, surrounded by a seal member 24. Provided interiorly of the blow-off pin is an air channel 25, extending outwardly through the side of the pin at a vent opening 29, positioned beneath the top surface 31 of the pin. Channel 25 is also open at its lower end 27, through the bottom of the pin.

Figure 4:
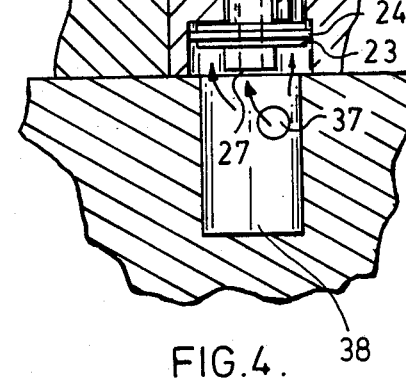

Pin 19 reciprocates from a retracted position, as shown in FIGS. 1 through 3, to an operating position as shown in FIG. 4. The pin remains in the retracted position during the introduction of the flowing plastic material to the molding cavity and during the shaping of the piece around the male body part. As will be clearly seen in FIGS. 1 through 3, the only part of the pin that is exposed during the actual molding operation is top surface 31, so that in the event of flashing, vent 29 is completely removed from exposure to mold material. Furthermore, the tolerance of the fitting of the pin within its slide bore is such that essentially no mold material can flash down the sides of the pin when retracted, thereby substantially eliminating any clogging of vent 29.

The retracted positioning of pin 19 is ensured, simply by the closing of the mold cavity as shown in FIG. 1 where the pin is effectively pushed to the retracted position. Furthermore, since the sequence of operation is one in which mold material is not introduced through injector 5 until the two mold sections are completely closed, this ensures that the mold material will not reach vent 29 before the pin has been retracted. In addition, preferably the pin is not fitted with any spring members, otherwise providing spring pressure against closing of the mold sections. The reason for eliminating this spring pressure is that the molding machine is set up to a specification level where even a slight biasing against closing of the two mold sections might effect the mold protection performance.

Only after the two mold sections have been separated from one another and stages 1 and 2 of the air eject, as described with respect to FIGS. 2 and 3 have been completed, does the pin become operational for completing lift off of piece 7 from male body part 1, as shown in FIG. 4 of the drawings. Here the air supply source feeds a supply of air through orifice 37 into accumulator chamber 38, beneath the pin. The base 35 of the pin is trapped within a recess 35 which allows but limits reciprocal movement of the pin. Seal 24 provides a seal against air escaping around the sides of enlarged bottom end 23 of pin 19. Therefore, the air must travel up through the lower end 27 of channel 25 within the pin. This pressure build up occurs only when the pin is initially in the retracted position, so that the air cannot escape out through vent 29, such that the build-up of pressure within the pin causes it to slide outwardly to the operating position of FIG. 4 where vent 29 in the sliding pin body clears beyond its covered position of FIGS. 1 through 3. As soon as the pin is moved to the FIG. 4 position the air is allowed to escape outwardly through vent 29 and provide a blow-off effect, as indicated by the arrows in FIG. 4, to provide final ejection of piece 7 from male body part 1. This final blow-off occurs only after the piece has been initially released in stages 1 and 2 of the blow-off described above, providing a slight gap between the piece and the male body part and allowing the air from vent 29 to enter into that gap to force the piece off of the the male body part.

Figure 5:
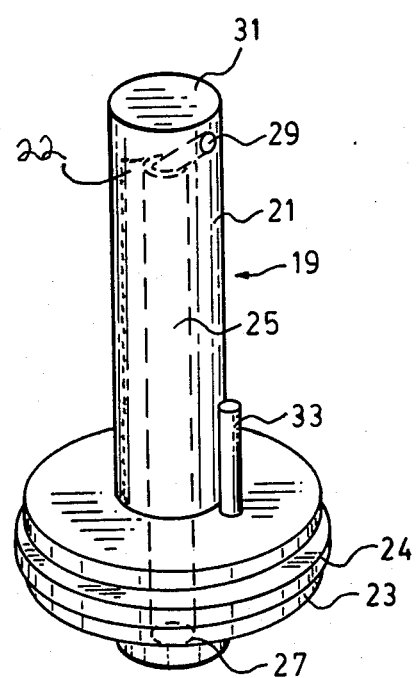
FIG. 5 is an enlarged perspective view of the blow-off pin, or nozzle, incorporated in the mold arrangement of FIGS. 1 through 4.

As will best be seen in FIG. 5, pin body 21 is provided with a flattened region 22. This flattened region provides a channel for the escape of any air trapped above the enlarged bottom portion of the pin, upwardly along the side of the pin body, as shown in FIG. 4 of the drawings. This air, if not allowed to escape, provides a resistance to the free sliding action of the pin.

In the event that further blow-off vents are required, these can be commonly provided in the one pin and directed to blow at different regions of the male body part for a balanced lifting or ejection of the piece. This arrangement of providing a plurality of vents in one pin is particularly beneficial in that all of the air pressure is directed to the one pin to maximize the effect of the air pressure on that pin.

A particularly advantageous feature of the present invention results from the discrete or extremely localized positioning enabled by the relatively small dimensions of the pin. This enables extremely tight tolerances of the pin, e.g. in the order of 2 to 6 ten thousandths of an inch, within the slide bore for the pin. At these tolerances, the flow of plastic material around the sides of the pin to the vent is substantially eliminated. However, at the same time, because the pin is at a discreet location and is of a readily controlled size, such tolerances still allow the pin to be easily slid between the retracted and the operating positions.

The pin cannot slide beyond the optimal operating position because of the trapping of enlarged lower end 23, within recess 35. In addition, means is provided for preventing rotation of the pin away from this operating position in the form of a secondary pin 33, extending upwardly from the enlarged lower end 23, of pin 19. This secondary pin travels within a recess 39 which while allowing reciprocation of the blow-off pin prevents its rotation and maintains vent 29 in a position where it will blow directly at the base of the mold male body part.

It will now be seen from the above, that with the preferred embodiment reciprocating pin or nozzle, there is very little chance of mold material ever gaining access to the vent through the pin. Furthermore, the sequence of operations is such that the air supply to the pin is discontinued as soon as the piece has been removed and before formation of further pieces, at which point the pin is moved to the retracted position by both the closing of the mold sections. However, in the event that mold material should ever enter the pin vent, the pin itself is easily removed and cleaned, or replaced, rather than having to gain access and unclog any fixed vent channels through the mold body.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An injection mold apparatus for molding a plastic piece, said injection mold apparatus comprising a mold cavity, means for injecting plastic material flowing into said mold cavity, a male body part having a base portion in said mold cavity with the plastic material forming the piece around said male body part, a female body part for mating with said male body part to shape the piece and a gas only ejection system for ejecting the piece after formation from said male body part, said gas only ejection system comprising a side opening vent in said male body part for side release of the piece and providing a gap between the piece and said male body part, a top opening vent in said male body part for top release and initial lifting of the piece from said male body part and a reciprocable pin fixed against rotation at the base portion of said male body part, said reciprocable pin being essentially freely movable from a retracted position to an operating position out of contact with the piece and being provided with a pin vent directing the gas under pressure into the gap between the piece and the male body part for blowing the piece thereoff and being pushed, during closing of said mold, by said female body part back to the retracted position away from said operating position within said mold cavity to avoid exposure to the plastic material when flowing into the closed mold.

2. An injection mold apparatus as claimed in claim 1, wherein said reciprocable pin has a closed top surface with said vent having inner and outer ends, the outer end of said vent opening through a side surface of said reciprocable pin.

3. An injection mold apparatus as claimed in claim 2, wherein said reciprocable pin is moved to the retracted position by said female body part closing on said male body part before the plastic material flows into the mold cavity and wherein said reciprocable pin is moved to the operating position by gas pressure within said reciprocable pin while in the retracted position.

4. An injection mold apparatus as claimed in claim 3, said reciprocable pin having a narrowed pin body with an enlarged bottom end confined within a travel-limiting recess in said mold cavity, said pin body extending out of said travel-limiting recess to the base portion of said male body part, the inner end of said vent opening through said enlarged bottom end of said reciprocable pin directly to a pressurized gas supply beneath said travel-limiting recess and blowing upwardly on said reciprocable pin into said vent and building air pressure within and causing said reciprocable pin to slide outwardly until cleared from the retracted position thereby releasing the air pressure through said vent at the base portion of said male body part.

5. An injection mold apparatus as claimed in claim 4, including an air escape passage along said narrowed pin body for allowing the escape of air trapped by said enlarged bottom end of said reciprocable pin and otherwise resisting movement of said reciprocable pin to the operating position.

* * * * *